United States Patent
Corgat et al.

(10) Patent No.: US 9,926,722 B2
(45) Date of Patent: Mar. 27, 2018

(54) POST LEVELLING DEVICE

(71) Applicants: Gerard Eugene Corgat, Lesmurdie (AU); Edward Joseph Khoury, Bateman (AU)

(72) Inventors: Gerard Eugene Corgat, Lesmurdie (AU); Edward Joseph Khoury, Bateman (AU)

( * ) Notice: Subject to any disclaimer, the term of this patent is extended or adjusted under 35 U.S.C. 154(b) by 240 days.

(21) Appl. No.: 14/871,657

(22) Filed: Sep. 30, 2015

(65) Prior Publication Data

US 2016/0097637 A1    Apr. 7, 2016

(51) Int. Cl.
*G01C 9/24* (2006.01)
*E04H 17/26* (2006.01)

(52) U.S. Cl.
CPC ............ *E04H 17/263* (2013.01); *G01C 9/24* (2013.01)

(58) Field of Classification Search
CPC .. G01C 9/24; G01C 9/26; E04H 17/14; E04H 17/16; E04H 17/22; E04H 17/26; E04H 17/263
USPC ..................................... 33/372, 373
See application file for complete search history.

(56) References Cited

U.S. PATENT DOCUMENTS

| | | | | |
|---|---|---|---|---|
| 4,976,040 A | * | 12/1990 | Mish ...................... | G01C 9/28 33/372 |
| 5,002,252 A | * | 3/1991 | Setala ................... | A47G 33/12 248/523 |
| 5,594,669 A | * | 1/1997 | Heger ..................... | G01C 9/06 33/343 |
| 6,419,201 B1 | * | 7/2002 | Hughes, Jr. ............ | G01C 15/00 248/514 |
| 6,502,322 B2 | * | 1/2003 | Smochek ................ | G01C 9/26 33/373 |
| 9,103,090 B2 | * | 8/2015 | Bushore .................. | E02D 27/42 |
| 2001/0034945 A1 | * | 11/2001 | Smochek ................ | G01C 9/26 33/373 |
| 2005/0155313 A1 | * | 7/2005 | Platt ....................... | E04F 11/18 52/832 |
| 2016/0097637 A1 | * | 4/2016 | Corgat ................... | E04H 17/263 33/373 |
| 2017/0160067 A1 | * | 6/2017 | Gallo ...................... | G01C 9/00 |

* cited by examiner

*Primary Examiner* — Yaritza Guadalupe
(74) *Attorney, Agent, or Firm* — Tope-McKay & Associates

(57) ABSTRACT

A post levelling device (10) comprising a support frame (12) engageable with a post (22). First and second legs (14, 16) are provided extending outwardly from support frame (12) such that the first and second legs (14, 16) are oriented in perpendicular first and second vertical planes. First and second level indicators (38, 40) arranged to indicate the angle of the support frame (12) relative to the vertical in each of the first and second vertical planes. One or more securing members (36, 37) extend from the support frame (12) to secure around the post (22). The first and second legs (14, 16) are length adjustable such that lower ends of the first and second legs (14, 16) may be engaged with the ground adjacent the post (22) and shortened or lengthened to adjust the support frame (12) to be oriented vertically.

15 Claims, 9 Drawing Sheets

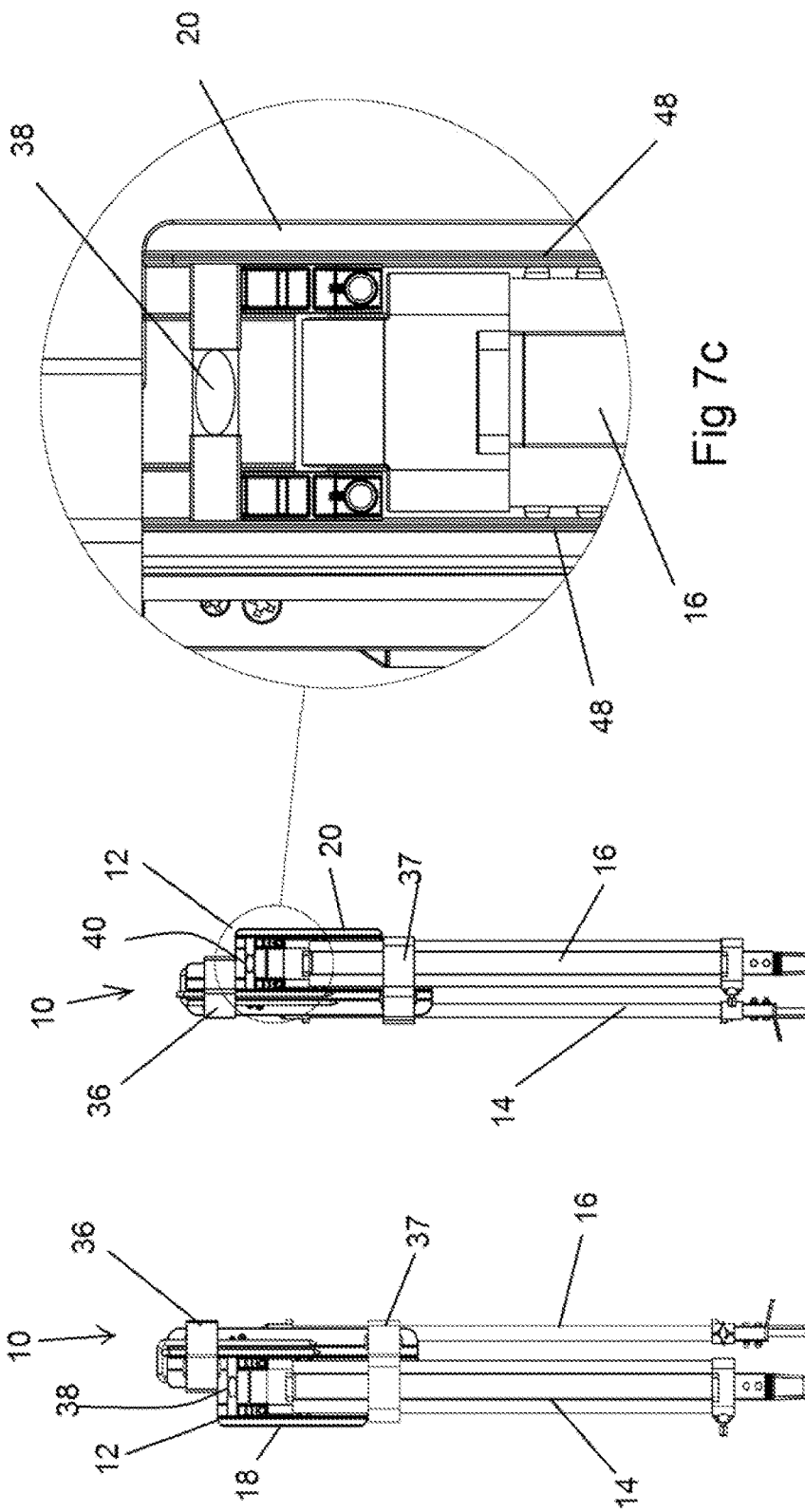

POST LEVELLING DEVICE

FIELD OF THE INVENTION

The present invention relates to a device for levelling posts to be secured in the ground.

BACKGROUND TO THE INVENTION

Installation of a post to form part of a fence or other structure generally involves placing the lower end of the post in a suitable hole and filling the hole with concrete. The post must generally be maintained in the hole in a vertical orientation during the securing process and this often involves simply holding a spirit level against the side of the post.

As the process of filling the hole with concrete can cause movement of the post, difficulty can arise in keeping the post vertical and it is often required to check the level of the post and adjust the post on a number of occasions.

The present invention relates to a device provided for assisting with levelling and supporting a post during the process of securing. The invention is designed to be easy to attach to the post and use as well as compact and easy to store and transport.

SUMMARY OF THE INVENTION

According to one aspect of the present invention there is provided a post levelling device comprising:
a support frame engageable with a post;
first and second legs extending outwardly from support frame such that the first and second legs are oriented in perpendicular first and second vertical planes;
first and second level indicators arranged to indicate the angle of the support frame relative to the vertical in each of the first and second vertical planes; and
one or more securing members extending from the support frame to secure around the post;
wherein the first and second legs are length adjustable such that lower ends of the first and second legs may be engaged with the ground adjacent the post and shortened or lengthened to adjust the support frame to be oriented vertically.

Preferably the support frame includes a first side wall and a second side wall perpendicular to the first side wall, wherein the first leg extends outwardly from the first side wall and the second leg extends outwardly from the second side wall.

Preferably the first and second side walls each comprises a planar member wherein a first longitudinal edge of the first side wall is connected to a first longitudinal edge of the second side wall such that the first and second side walls define an L-shaped channel.

In a preferred embodiment, first ends of the first and second legs are pivotally secured to the first and second side walls to each pivot through a plane perpendicular to the plane of the respective first or second side wall.

Preferably each of the first and second side walls include a pair of flanges extending from an outer surface thereof such that the pairs of flanges define gaps into which the first ends of the first and second legs are received.

In one embodiment, the first ends of the first and second legs are each provided with a transverse pin, ends of which are received in holes in mounting brackets secured to adjacent sides of each of the pairs of flanges.

In one embodiment, each of the first and second level indicators comprises a spirit level tube mounted between adjacent sides of the flanges above the first ends of the legs.

Preferably the first and second legs each comprise a first portion forming the upper end of the leg and a second portion forming the lower end of the leg wherein the second portion is received within the first portion in a telescoping arrangement.

Preferably a locking device is provided to fix relative movement of the first and second portions of the legs.

In a preferred embodiment, each of the securing members comprises a securing strap having a first end secured to the first or second side wall of the support frame and a second end securable relative to the support frame such that the securing strap extends around outer surfaces of the first and second side walls and across between second longitudinal edges of the first and second side walls.

Preferably there is provided a first securing strap located adjacent an upper first end of the support frame and a second securing strap located adjacent a lower second end of the support frame.

Preferably the flanges on the outer surface of the first and second side walls are provided with slots adjacent the upper and lower ends thereof through which the securing straps are passed.

In one embodiment, the securing straps include portions of hook and loop material such that each of the securing straps may be secured to itself after passing around the post.

In a preferred embodiment, each of the first and second side walls are provided with narrowed end portions at upper and lower ends thereof across which the first and second securing straps pass.

In one embodiment, the first and second legs each a tapered end at a second end thereof.

In one embodiment, a foot is provided extending outwardly from each of the legs adjacent the second end thereof.

BRIEF DESCRIPTION OF THE DRAWINGS

The invention will now be described, by way of example, with reference to the following drawings in which:

FIG. 7*a* is a second side view of the post levelling device of FIG. 1;

FIG. 7*b* is a rear view of the post levelling device of FIG. 1;

FIG. 7*c* is a close up view of a level indicator of the post levelling device;

DETAILED DESCRIPTION OF PREFERRED EMBODIMENTS

Figure 1:
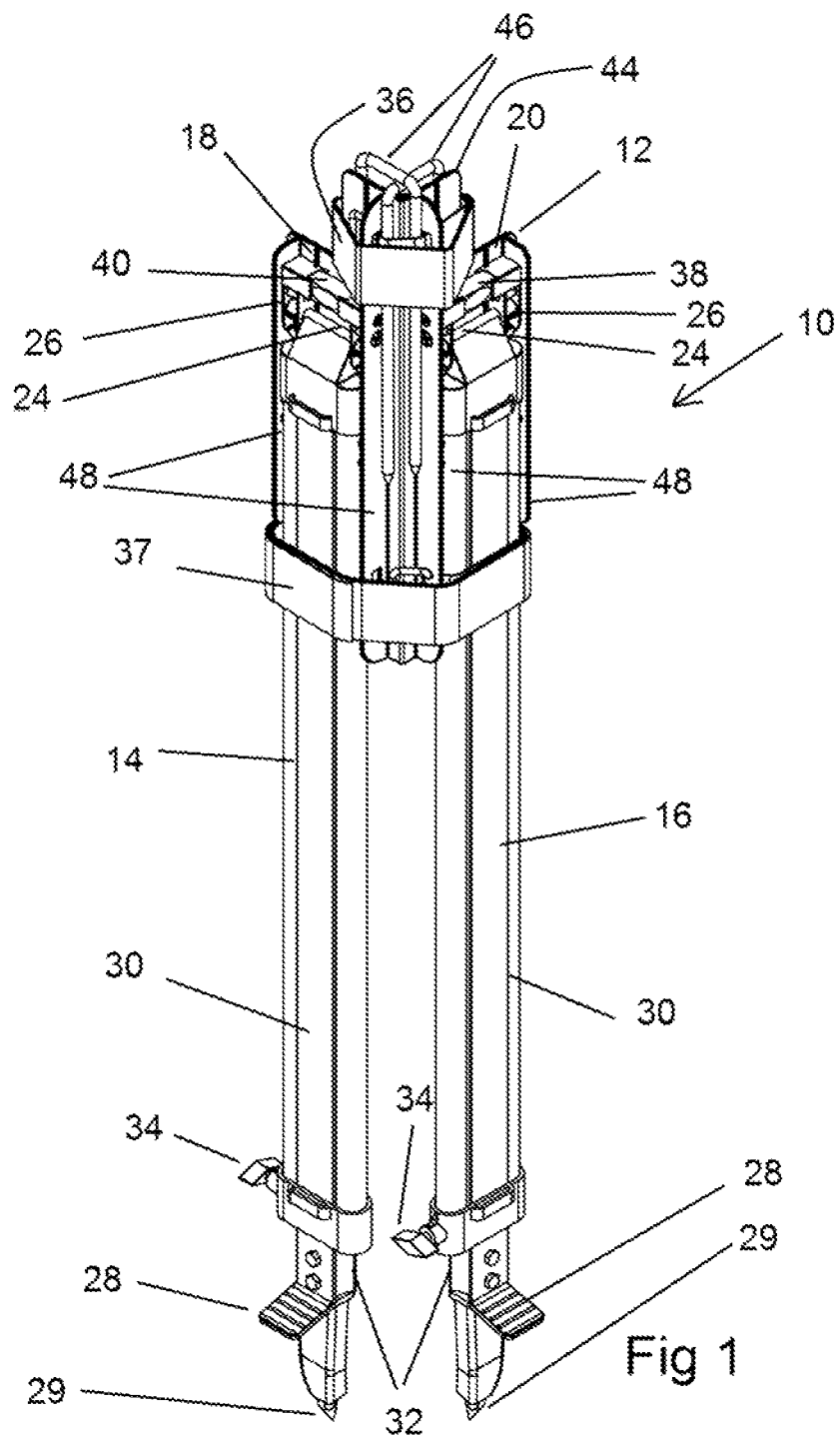
FIG. 1 is a first upper perspective view of a post levelling device in accordance with the present invention with the legs fully retracted.
Figure 2:
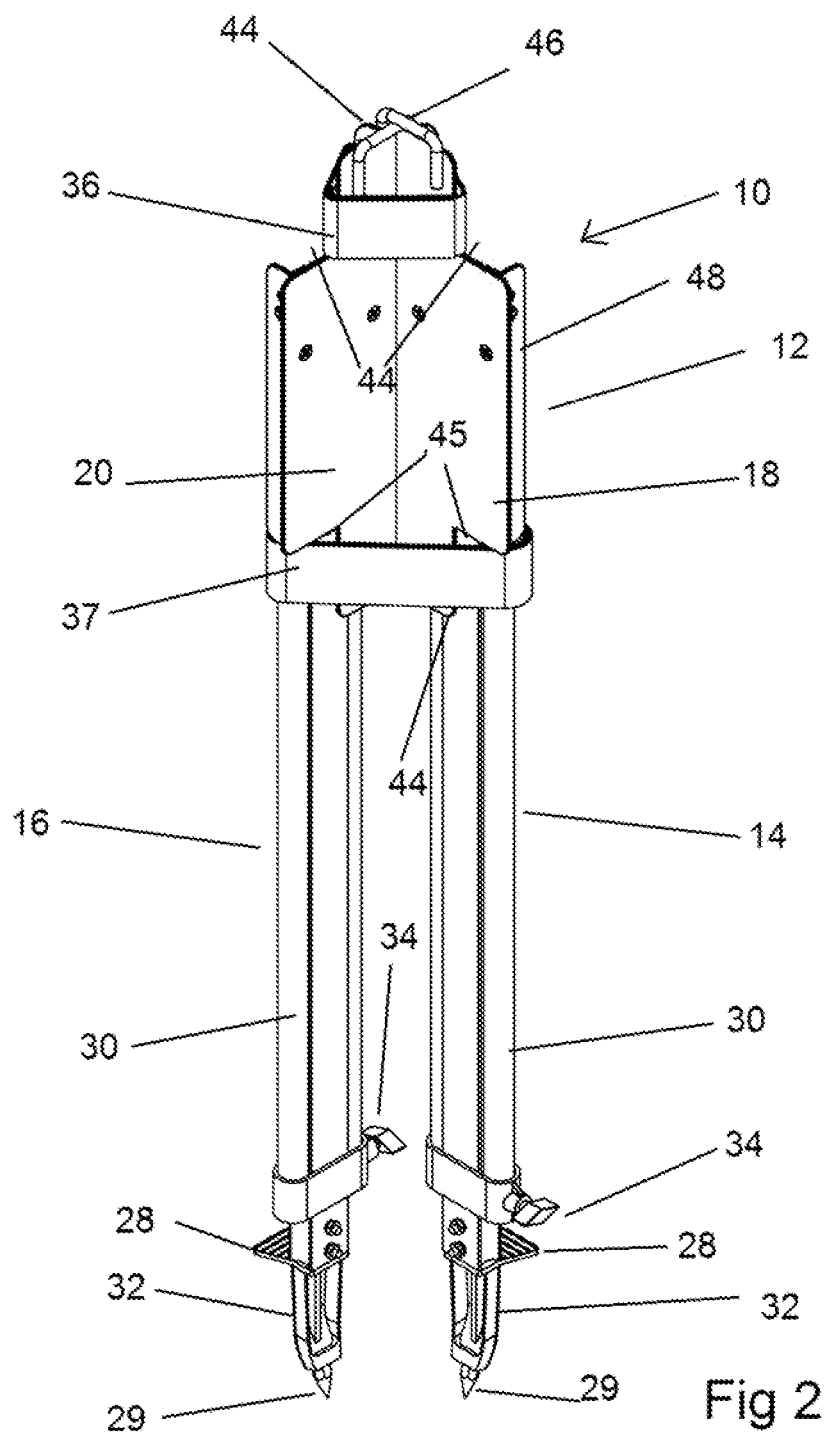
FIG. 2 is a second upper perspective view of the post levelling device of FIG. 1.
Figure 3:
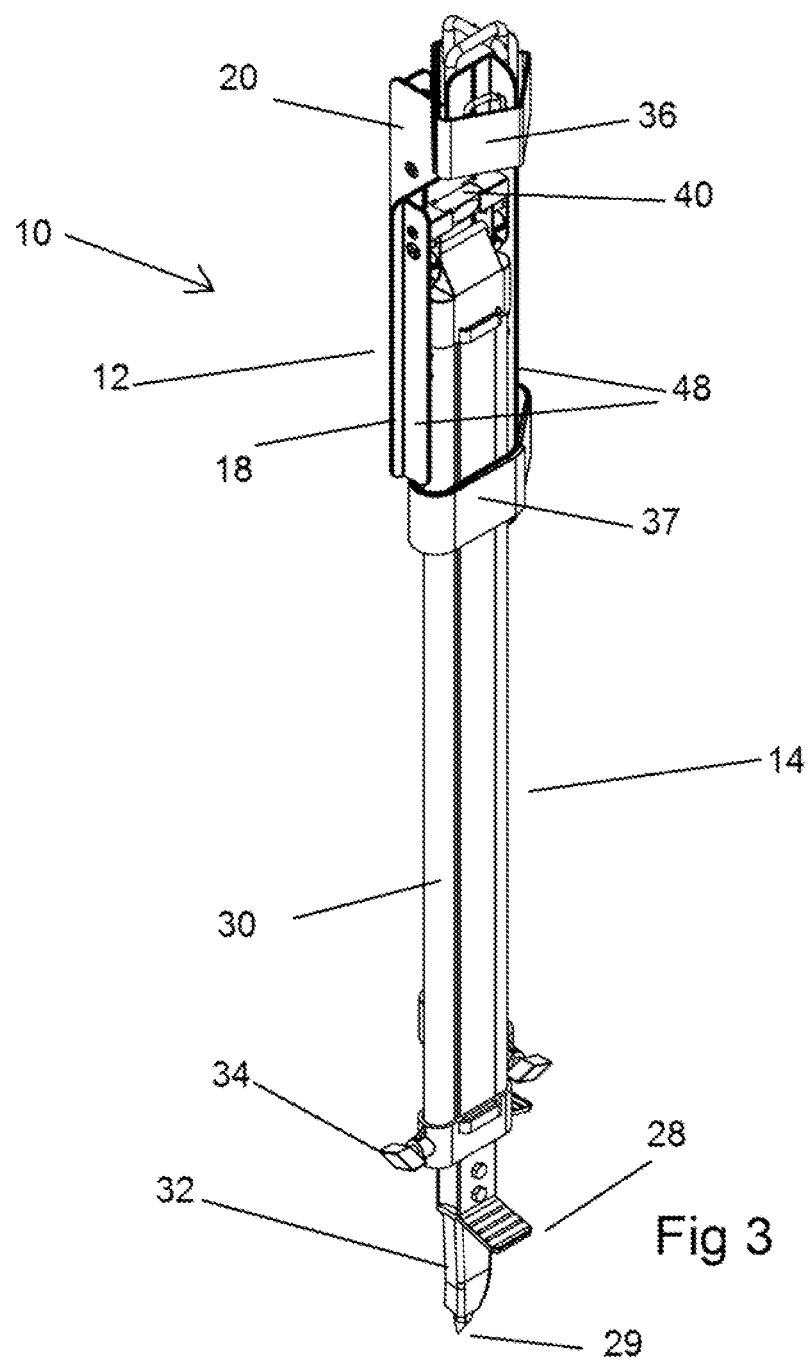
FIG. 3 is a third upper perspective view of the post levelling device of FIG. 1.
Figure 4:
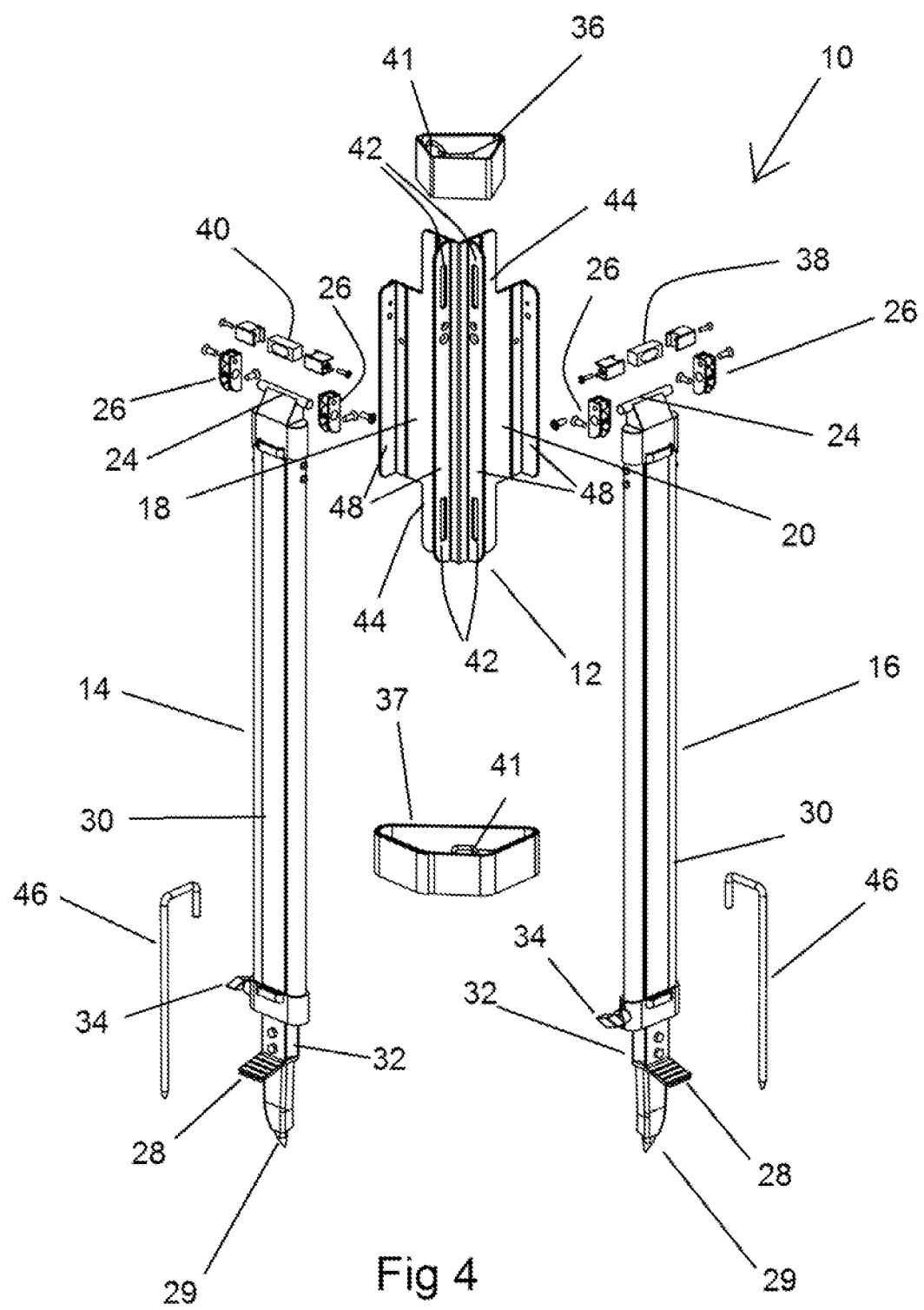
FIG. 4 is an exploded view of the post levelling device of FIG. 1.

Referring to the Figures, there is shown a post levelling device 10 comprising generally a support frame 12 having a first leg 14 and a second leg 16. The support frame 12 comprises a first side wall 18 and a second side wall 20. The first and second side walls 18 and 20 each comprise a planar member wherein a first longitudinal edge of the first side wall 18 is connected to a first longitudinal edge of the second side wall 20.

Figure 8B:
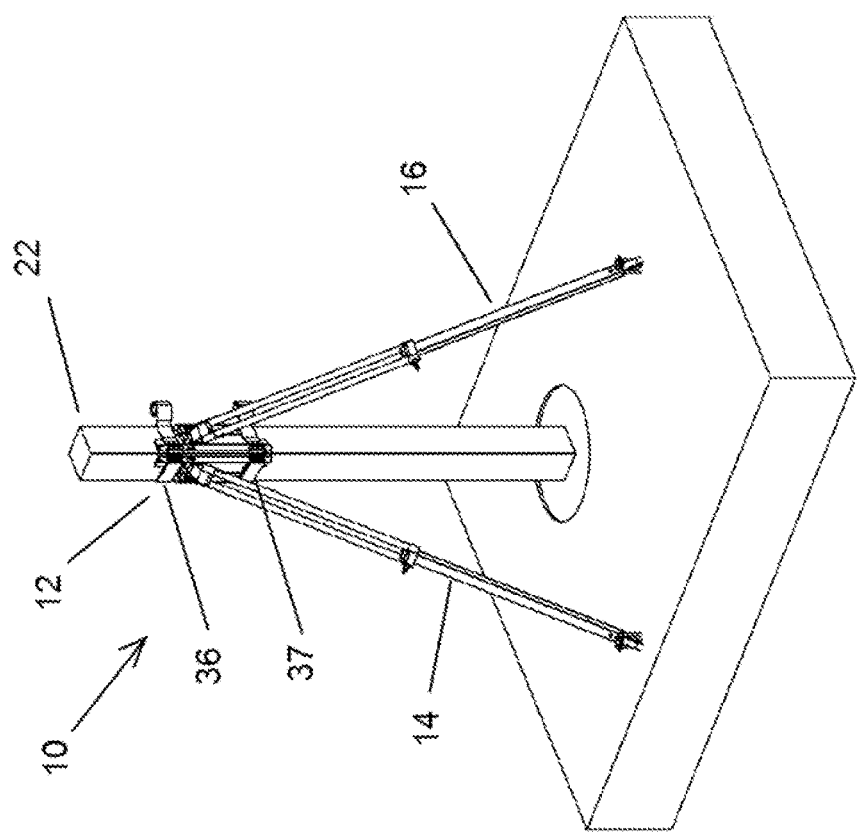
FIG. 8b is a second upper perspective view of the post levelling device with the legs extended and engaged with the post.
Figure 8A:
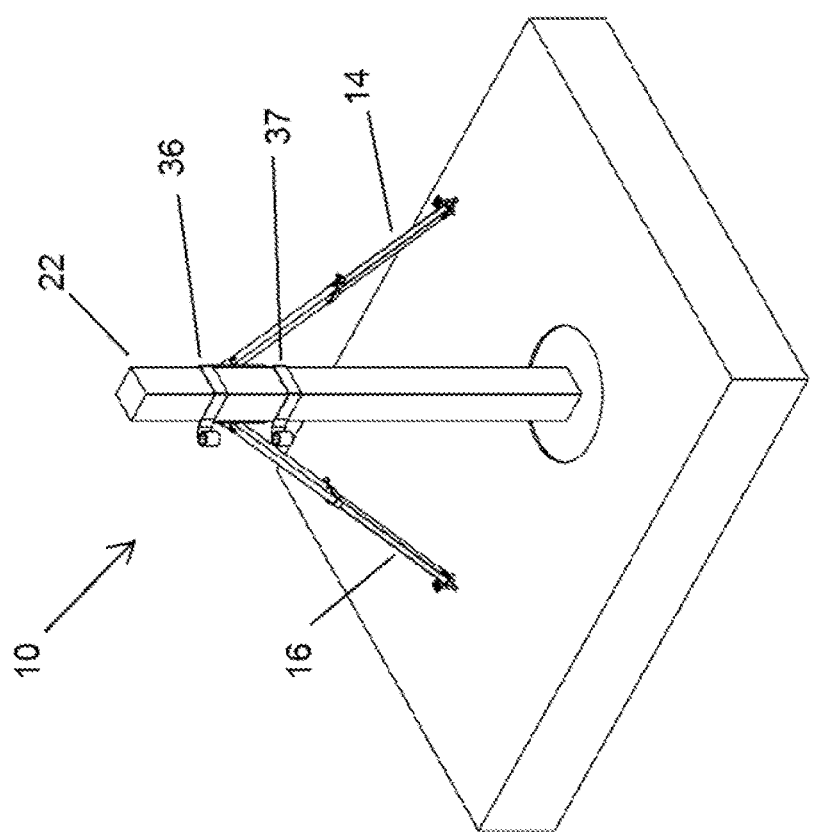
FIG. 8a is a first upper perspective view of the post levelling device with the legs extended and engaged with a post.
Figure 9B:
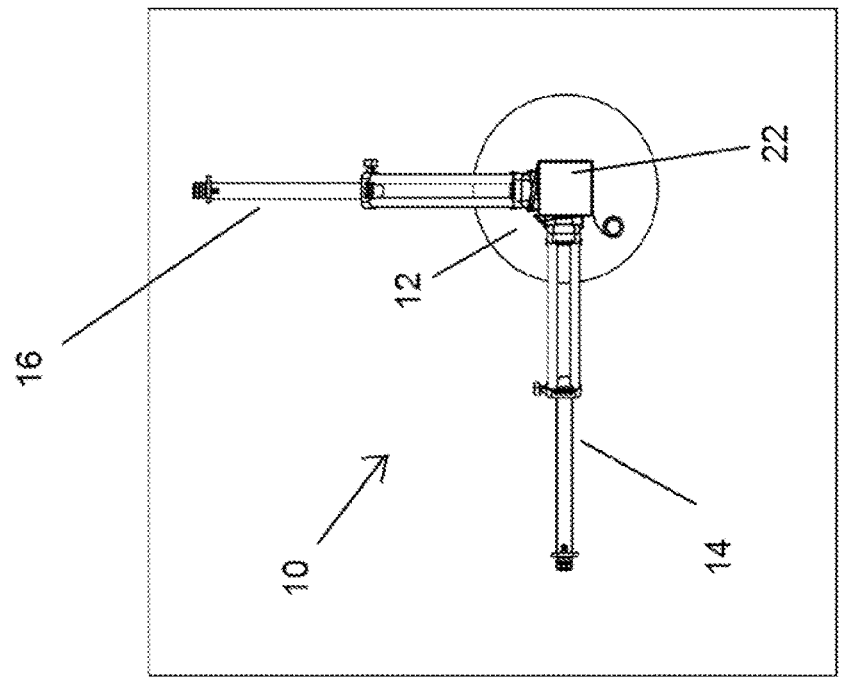
FIG. 9b is a second side view of the post levelling device with the legs extended and engaged with the post.
Figure 9A:
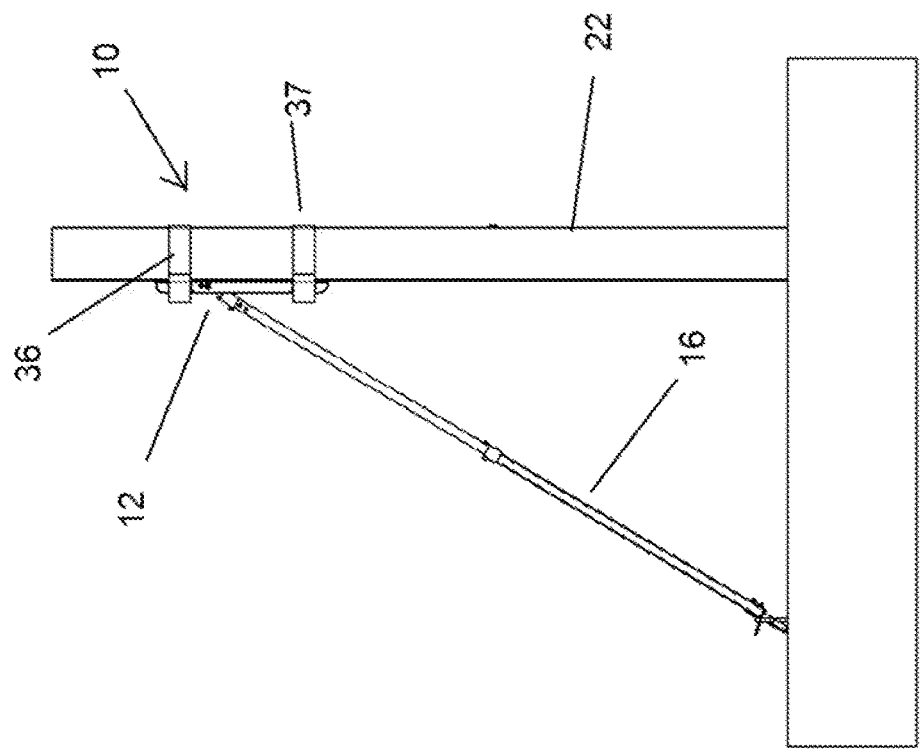
FIG. 9a is a first side view of the post levelling device with the legs extended and engaged with the post.

The first and second side walls 18 and 20 are oriented perpendicular to each other such that the first and second side walls 18 and 20 define an L-shaped channel. The support member 12 is provided to engage with a post 22, as shown in FIGS. 7 and 8. The support member 12 is held against the post 22 such that an inner surface of the first side wall 18 engages with a first side of the post 22 and an inner surface of the second side wall 20 engages with a second perpendicular side of the post 22. In the embodiment shown, the post 22 has a rectangular transverse cross section, however the support frame 12 will still engage with posts 22 of other cross sectional shapes, such as circular posts. The L-shaped cross section of the support member 12 allows the support member 12 to be engaged with the post 22 by simply moving the support member 12 directly towards the post 22 until the post 22 engages with the inner surfaces of the first and second side walls 18 and 20.

The first leg 14 is secured at an upper end thereof to an outer surface of the first side wall 18. The second leg 16 is secured at an upper end thereof to an outer surface of the second side wall 20. The upper end of the first leg 14 is pivotally connected to the first side wall 18 such that the first leg 14 can pivot through a plane perpendicular to the plane of the first side wall 18. The upper end of the second leg 16 is pivotally connected to the second side wall 20 such that the second leg 16 can pivot through a plane perpendicular to the plane of the second side wall 20. The first and second legs 14 and 16 are therefore moveable through perpendicular first and second vertical planes.

Figure 5:
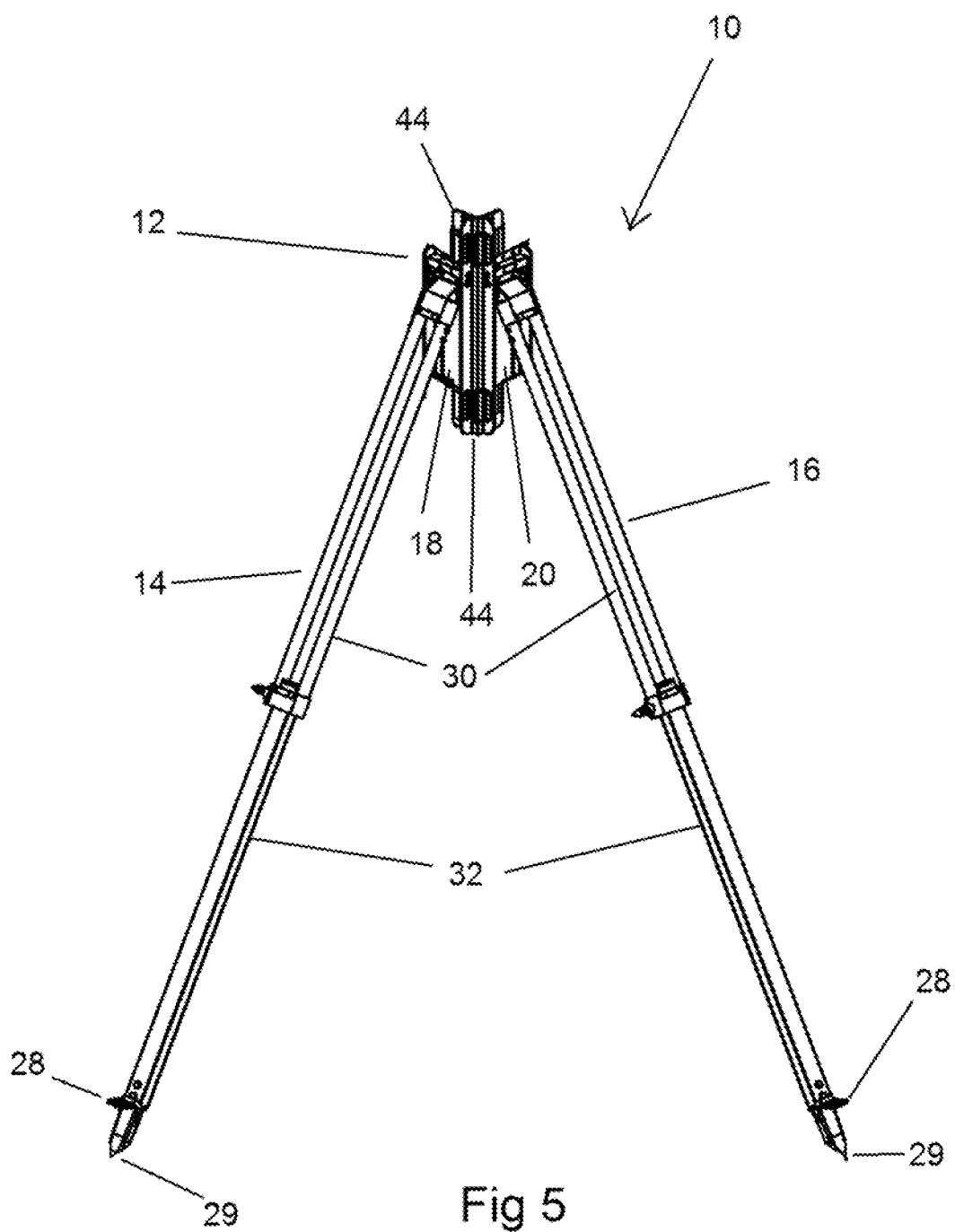
FIG. 5 is a view of the post levelling device with the legs in an extended position.
Figure 6C:
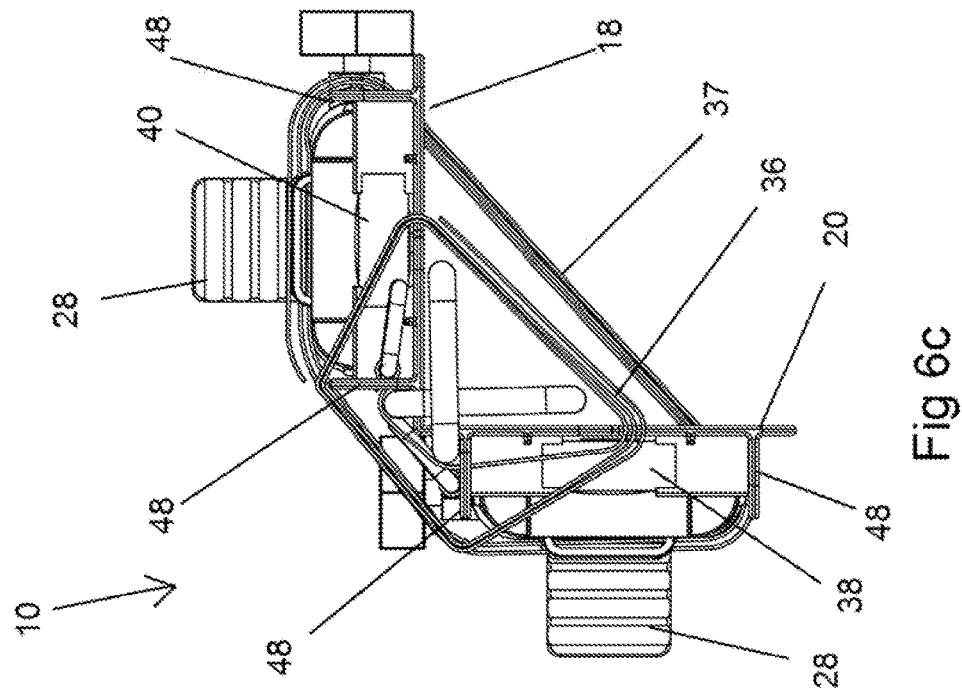
FIG. 6*c* is a top view of the post levelling device of FIG. 1.
Figure 6B:
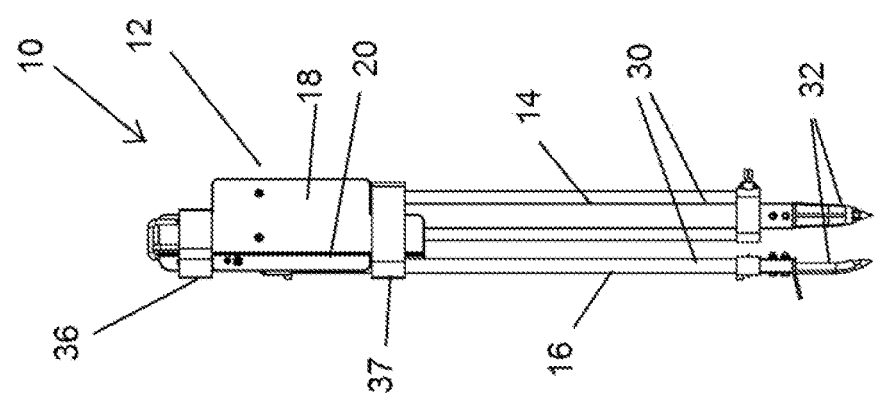
FIG. 6*b* is a first side view of the post levelling device of FIG. 1.
Figure 6A:
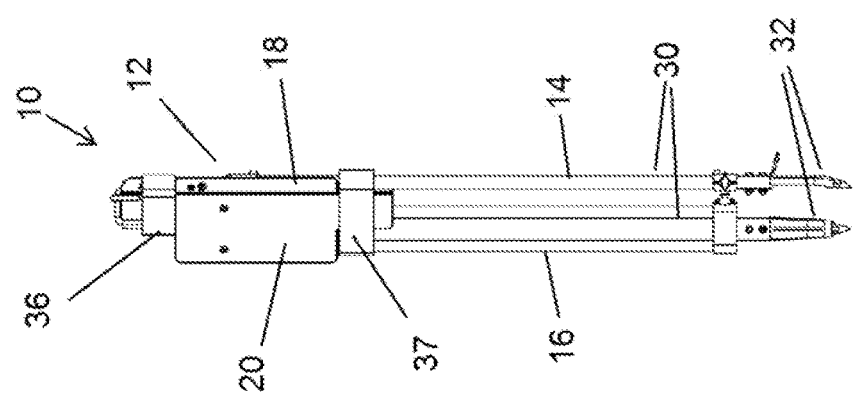
FIG. 6*a* is a front view of the post levelling device of FIG. 1.

The first and second legs 14 and 16 are moveable between a retracted position (as shown in FIG. 1) in which the legs 14 and 16 are parallel to the planes of the first and second side walls 18 and 20 and an extended position (as shown in FIG. 5), in which the legs 14 and 16 are angled away from the outer surfaces of the first and second side walls 18 and 20.

In the embodiment shown, each of the first and second side walls 18 and 20 includes a pair of flanges 48 extending outwardly therefrom. The flanges 48 extend along the outer surfaces of the first and second side walls 18 and 20 and are oriented parallel to the intersection of the first and second side walls 18 and 20. The flanges 48 on each of the first and second side walls 18 and 20 define a gap into which the first ends of the first and second legs 14 and 16 are received.

The first ends of the first and second legs 14 and 16 are provided with a transverse pin 24 secured thereto. A pair of mounting brackets 26 are also provided adjacent the first ends of each of the first and second legs 14. The brackets 26 are secured to adjacent sides of each of the pairs of flanges 48 and each of the brackets 26 includes a hole into which an end of the pin 24 is received. The first and second legs 14 and 16 are thereby pivotally secured to the first and second side walls 18 and 20 such that the legs 14 and 16 are rotatable about axes passing through the pins 24.

The first and second legs 14 and 16 each a tapered end 29 at a second end thereof. The tapered ends 29 are provided to allow the second ends of the legs 14 and 16 to engage into the ground. A foot 28 is provided extending outwardly from each of the legs 14 and 16 adjacent the second ends thereof. The feet 28 are provided to allow the second ends to be pressed into the ground by pushing downwardly on the feet 28.

The first and second legs 14 and 16 are also each length adjustable such that the first and second legs 14 and 16 may be lengthened or shortened. In the embodiment shown, each of the legs 14 and 16 comprises a first portion 30 forming the upper end of the leg 14 or 16 and a second portion 32 forming the lower end of the leg 14 or 16. The second portion 32 is received within the first portion 30 in a telescoping arrangement.

A locking device 34 is provided to fix relative movement of the first and second portions 30 and 32 of the legs 14 and 16. The locking device 34 comprises a clamp member provided adjacent the lower end of the first portion 30 of the leg 14 or 16. The clamp member may be tightened to secure the first and second portions 30 and 32 of the leg 14 or 16 and thereby fix the length of the leg 14 or 16.

The support frame 12 is also provided with a first level indicator 38 and a second level indicator 40. The first level indicator 38 provides an indication of the angle of the first side wall 18 relative to the vertical. The second level indicator 40 provides an indication of the angle of the second side wall 20 relative to the vertical. In the embodiment shown, the first level indicator 38 comprises a spirit level tube mounted horizontally on the second side wall 20 and the second level indicator 40 comprises a spirit level tube mounted horizontally on the first side wall 18. The first and second level indicators 38 and 40 are mounted between adjacent sides of the flanges 48 above the first ends of the legs 14 and 16.

The support frame 12 includes also one or more securing members provided to secure the support frame 12 against the post 22. The securing members comprise securing straps. In the embodiment shown, there is provided a first securing strap 36 located adjacent an upper first end of the support frame 12 and a second securing strap 37 located adjacent a lower second end of the support frame 12.

Each of the securing straps 36 and 37 includes a first end secured the first or second side wall 18 or 20 of the support frame 12. The flanges 48 on the outer surface of the first and second side walls 18 and 20 are provided with slots 42 adjacent the upper and lower ends thereof. The slots 42 are provided such that the securing straps 36 and 37 may be passed through the slots 42. First ends of the securing straps 36 and 37 are provided in the embodiment shown with buckles 41 which engage with one of the flanges 48 adjacent the slot 42.

The securing straps 36 and 37 may be passed around the support frame 12 such that the securing straps 36 and 37 extend across outer surfaces of the first and second side walls 18 and 20 and across between second longitudinal edges of the first and second side walls 18 and 20, the second longitudinal edges being opposite the first longitudinal edges thereof. The securing straps 36 and 37 may therefore be passed around the post 22 when received against the inner surfaces of the first and second side walls 18 and 20.

A second end of each of the securing straps 36 and 37 is securable relative to the support frame 12 after passing around post 22 such that the securing straps 36 and 37 hold the post 22 against the inner surfaces of the first and second side walls 18 and 20. The securing straps 36 and 37 may include portions of hook and loop material such that each of the securing straps 36 and 37 may be secured to itself after passing around the post 22.

Each of the first and second side walls 18 and 20 are provided with narrowed end portions 44 at upper and lower ends thereof. The narrowed end portions comprise portions of the first and second side walls 18 and 20 in which the width of the side walls 18 and 20 between the first and second longitudinal edges is less than the width between the first and longitudinal edges midway between the upper and lower ends of the support frame 12.

The first and second securing straps 36 and 37 are aligned with the narrowed end portions 44. The narrowed end portions 44 are provided to allow the securing straps 36 and 37 to pull tight around narrower posts which may not extend beyond the extents of the first and second side walls 18 and 20 at their widest points.

The post levelling device 10 may also be provided with ground stakes 46. The ground stakes 46 may be engaged over the feet 28 and inserted into the ground to secure the first and second legs 14 and 16 relative to the ground.

In use, the post levelling device 10 is used generally as shown in FIGS. 7 and 8. The support frame 12 is oriented such that inner surfaces of the first and second side walls 18 and 20 engage against side walls of the post 22. The securing straps 36 and 37 are then passed around the post 22 and second ends secured relative to the support frame 12 to engage the support frame 12 to the post 22. The legs 14 and 16 may then be extended to engage with the ground. Each of the legs 14 and 16 is then lengthened or shortened until the level indicators 38 and 40 shows that the respective first and second side walls 18 or 20 are vertical. The length of the legs 14 and 16 may then be fixed and the post levelling device 10 will hold the post 22 in a vertical orientation such that an appropriate securing material may be used to fix the post 22 in place.

The legs 14 and 16 may be provided with markings to indicate the length of the legs 14 and 16. The markings may comprise numerical markings provided on the second portions 32 of the legs 14 and 16 such that the number of markings visible provide an indication of the length of the leg 14 or 16.

When the post levelling device 10 is not in use, the legs 14 and 16 may be shortened to a minimum length and the legs 14 and 16 pivoted to the retracted position. The securing straps 36 and 37 may be passed around the legs 14 and 16 to secure the post levelling device 10 in this collapsed position for transport and/or storage.

It will be readily apparent to persons skilled in the relevant arts that various modifications and improvements may be made to the foregoing embodiments, in addition to those already described, without departing from the basic inventive concepts of the present invention.

What is claimed is:

1. A post levelling device comprising:
   a support frame engageable with a post;
   first and second legs extending outwardly from support frame such that the first and second legs are oriented in perpendicular first and second vertical planes, the first and second legs being length adjustable such that lower ends of the first and second legs may be engaged with the ground adjacent the post and shortened or lengthened to adjust the support frame to be oriented vertically;
   first and second level indicators arranged to indicate the angle of the support frame relative to the vertical in each of the first and second vertical planes;
   a first securing strap located adjacent an upper first end of the support frame and a second securing strap located adjacent a lower second end of the support frame, each of the securing straps having a first end secured to the first or second side wall of the support frame and a second end securable relative to the support frame such that the securing strap extends around outer surfaces of the first and second side walls and across between second longitudinal edges of the first and second side walls;
   wherein each of the first and second side walls are provided with narrowed end portions at upper and lower ends thereof across which the first and second securing straps pass.

2. A post levelling device in accordance with claim 1, wherein the support frame includes a first side wall and a second side wall perpendicular to the first side wall, wherein the first leg extends outwardly from the first side wall and the second leg extends outwardly from the second side wall.

3. A post levelling device in accordance with claim 2, wherein the first and second side walls each comprises a planar member wherein a first longitudinal edge of the first side wall is connected to, a first longitudinal edge of the second side wall such that the first and second side walls define an L-shaped channel.

4. A post levelling device in accordance with claim 3, wherein first ends of the first and second legs are pivotally secured to the first and second side walls to each pivot through a plane perpendicular to the plane of the respective first or second side wall.

5. A post levelling device in accordance with claim 4, wherein each of the first and second side walls include a pair of flanges extending from an outer surface thereof such that the pairs of flanges define gaps into which the first ends of the first and second legs are received.

6. A post levelling device in accordance with claim 5, wherein the first ends of the first and second legs are each provided with a transverse pin, ends of which are received in holes in mounting brackets secured to adjacent sides of each of the pairs of flanges.

7. A post levelling device in accordance with claim 6, wherein each of the first and second level indicators comprises a spirit level tube mounted between adjacent sides of the flanges above the first ends of the legs.

8. A post levelling device in accordance with claim 5, wherein the flanges on the outer surface of the first and second side walls are provided with slots adjacent the upper and lower ends thereof through which the securing straps are passed.

9. A post levelling device in accordance with claim 8, wherein the securing straps include portions of hook and loop material such that each of the securing straps may be secured to itself after passing around the post.

10. A post levelling device in accordance with claim 5, wherein each of the first and second level indicators comprises a spirit level tube mounted between adjacent sides of the flanges above the first ends of the legs.

11. A post levelling device in accordance with claim 1, wherein the first and second legs each comprise a first portion forming the upper end of the leg and a second portion forming the lower end of the leg wherein the second portion is received within the first portion in a telescoping arrangement.

12. A post levelling device in accordance with claim 11, wherein a locking device is provided to fix relative movement of the first and second portions of the legs.

13. A post levelling device in accordance with claim 1, wherein the first and second legs each a tapered end at a second end thereof.

14. A post levelling device in accordance with claim 1, wherein a foot is provided extending outwardly from each of the legs adjacent the second end thereof.

15. A post levelling device in accordance with claim 1, wherein the securing straps include portions of hook and loop material such that each of the securing straps may be secured to itself after passing around the post.

* * * * *